United States Patent Office 3,118,766
Patented Jan. 21, 1964

3,118,766
PHOTOGRAPHIC PRODUCTS AND PROCESSES
Peter H. Roth, Watertown, Mass., assignor to Polaroid Corporation, Cambridge, Mass., a corporation of Delaware
No Drawing. Filed May 31, 1962, Ser. No. 198,763
15 Claims. (Cl. 96—114)

The present invention is concerned with the preparation of photographic silver halide emulsions and more particularly with the preparation of emulsions having improved photographic properties.

Generally, silver halide emulsions are prepared by reacting a water-soluble silver salt, such as silver nitrate, with at least one water-soluble halide such as potassium bromide, sodium bromide, potassium iodide or sodium iodide in an aqueous solution comprising a peptizing agent such, for example, as gelatin. The dispersion of silver halide thus formed also contains water-soluble salts, produced by the double decomposition reaction, and usually excess reagents. It has been generally found desirable to remove such water-soluble salts and reagents. One method employed comprises having present in the silver halide dispersion, at least after its formation, an acid-coagulable derivative of gelatin, and lowering the pH to bring about precipitation. Upon precipitation, the acid-coagulable derivatives carry the silver halide salts with them, leaving the soluble salts in solution, for removal by decantation. When desired, the precipitate may be washed to remove additional salts. As examples of such processes mention may be made of those disclosed in U.S. Patents Nos. 2,614,928, 2,614,929, and 2,728,662 wherein aromatic sulfonyl chloride, carboxylic acid chloride and carboxylic acid anhdydride derivatives of gelatin are employed as the acid-coagulable materials. The present invention is concerned with improved processes of this nature.

One object of the present invention is to provide processes for preparing silver halide emulsions which employ novel acid-coagulable derivatives of gelatin and which produce emulsions having increased speed.

Other objects of the invention will in part be obvious and will in part appear hereinafter.

The invention accordingly comprises the process involving the several steps and the relation and order of one or more of such steps with respect to each of the others and the product possessing the features, properties and the relation of components which are exemplified in the following detailed disclosure, and the scope of the application of which will be indicated in the claims.

For a fuller understanding of the nature and objects of the invention, reference should be had to the following detailed description.

It has been found in the present invention that when gelatin derivatives of trimellitic acid anhydride, i.e., the 1,2 anhydride of 1,2,4-benzene tricarboxylic acid, are used as the acid-coagulable material in the precipitation step, the resulting emulsions have increased speed and are more responsive to chemical sensitizers.

In a preferred mode of carrying out the present invention, the trimellitic acid anhydride derivative of gelatin is used as the peptizing agent during the formation of the silver halide salt. In such an embodiment, the soluble silver salt and the soluble halide salt are added, with vigorous stirring, to an aqueous solution comprising the trimellitic acid anhydride derivative. Subsequent to the silver halide formation, the pH of the resulting dispersion is lowered by the addition of a suitable acid such, for example, as a mineral acid, until coagulation takes place and the silver halide and gelatin derivative precipitate out. Usually, lowering the pH to a range of from about 4.5 to about 2 will bring about such precipitation. The resulting precipitate is then separated from the supernatant liquid and, when desired, washed. The resulting precipitate may be redispersed for further compounding by raising the pH through the addition of a suitable base such, for example, as ammonium hydroxide, sodium hydroxide, etc.

In another mode of carrying out the processes of the present invention, the silver halide is prepared in the presence of a regular peptizing agent such, for example, as gelatin and the trimellitic acid anhydride derivative is subsequently added. Generally the ratio, by weight, of derivative to the instant peptizing agent will be at least 1 to 3, preferably it will be at least 1 to 1 and more preferably at least 2 to 1. When desired, a much higher ratio may be employed, e.g., 10 to 1. Upon lowering the pH, the derivative precipitates out carrying with it the gelatin and the silver halide.

The silver halide emulsions prepared by the processes of this invention may be further componuded with additional gelatin, gelatin derivaties or other protective colloids.

The gelatin derivatives of this invention may be prepared by reacting gelatin with the trimellitic acid anhydride in an alkaline medium. Preferably the reaction is carried out at a pH of about 8 to 10 at a temperature of about 20 to 60°. The amount of anhydride employed may be varied over a considerable range. Generally use of at least about 5%, by weight, of the anhydride based on the weight of the gelatin will be effective. Especially good results have been obtained by using about 10%, by weight, of the anhydride based on the weight of the gelatin.

The following non-limiting example illustrates the preparation of gelatin derivatives within the scope of this invention.

*Example 1*

A 10% aqueous gelatin solution, having a pH of about 8.5, was prepared and heated to about 50° C. Over a 30 minute period an amount of trimellitic anhydride equal to about 10%, by weight, of the gelatin was stirred in while maintaining the temperature at about 50° C. and the pH at about 8.5. After the trimellitic anhydride was completely added the reaction was continued for about 15 minutes while maintaining the temperature and pH at the initial levels. The solution was then adjusted to a final pH of about 6.2.

The following non-limiting example illustrates the preparation of a silver halide emulsion through the processes of the present invention.

*Example 2*

A 20 ml. portion of a silver nitrate solution comprising 10 g. of silver nitrate and 120 ml. of water was added with rapid stirring to a solution comprising 220 ml. of water, 18.2 g. ammonium bromide, 3 ml. of a 10% potassium iodide solution, 1.5 ml. of concentrated ammonia water and 10 g. of a gelatin-trimellitic anhydride derivative as prepared in Example 1. The balance of the silver nitrate solution was then added over a 12 minute period. After a pause of 5 minutes, half of a second silver nitrate solution comprising 120 ml. of water and 20 g. silver nitrate was then added. After a further pause of about 10 minutes, the balance of the second silver nitrate solution was added. The resulting emulsion was precipitated by reducing the pH to 3 with sulfuric acid. The precipitate was then washed until the supernatant water had a resistivity of 4000 ohm-cm. Thirty grams of an inert after-ripening gelatin was then added and the volume was adjusted with water to 600 ml. The gel was dissolved by heating to 35° C. and adjusting the pH to 6.0 and the pAg to 8.75. At this point, 0.5 ml. of a 0.1% sodium thiosulfate solution and 0.5 ml. of a 0.1% gold thiocyanate solution were added. The emulsion was ripened at 60° C.

The emulsion prepared in Example 2 above, and emulsions prepared in a similar manner using succinic anhydride, phthalic anhydride, benzene sulphonyl chloride and maleic anhydride derivatives of gelatin were exposed, developed by standard procedures and compared.

The following comparative results were obtained:

| Gelatin Derivative Used for Making— | Speed | Fog | Gamma | D-Max. |
|---|---|---|---|---|
| Trimellitic anhydride | 260 | 0.10 | 0.40 | 1.74 |
| Succinic anhydride | 114 | 0.09 | 0.30 | 1.38 |
| Phthalic anhydride | 200 | 0.16 | 0.36 | 1.50 |
| Benzene sulphonyl chloride | 158 | 0.10 | 0.46 | 1.46 |
| Maleic anhydride | 158 | 0.10 | 0.46 | 1.80 |

As can be noted a substantial increase in speed was obtained using the trimellitic anhydride derivative.

The emulsions of the present invention may be chemically sensitized by any of the accepted procedures. For example, the emulsions may be digested with naturally active gelatin, or sulfur compounds can be added such as those described in U.S. Patents Nos. 1,574,944, 1,623,499, and 2,410,689.

The emulsions may also be treated with salts of the noble metals such as ruthenium, rhodium, palladium, iridium, and platinum, all of which belong to group VIII of the periodic table of elements and have an atomic weight greater than 100. The salts may be used for sensitizing in amounts below that which produce any substantial fog inhibition, as described in U.S. Patent No. 2,448,060, and as antifoggants in higher amounts, as described in U.S. Patents Nos. 2,566,245 and 2,566,263.

The emulsions may also be chemically sensitized with gold salts as described in U.S. Patent No. 2,399,083 or stabilized with gold salts as described in U.S. Patents Nos. 2,597,856 and 2,597,915.

The emulsions may further be chemically sensitized with reducing agents such as stannous chloride as described in U.S. Patent No. 2,487,850; amines such as diethylenetriamine as described in U.S. Patent No. 2,518,698; polyamides such as spermine as described in U.S. Patent No. 2,521,925; or bis-($\beta$-aminoethyl)-sulfide and its water-soluble salts as described in U.S. Patent No. 2,521,926.

The emulsions may also be stabilized with the mercury compounds of U.S. Patents Nos. 2,728,663, 2,728,664, and 2,728,665.

The emulsions may also be optically sensitized with cyanine and merocyanine dyes as described in U.S. Patents Nos. 1,846,301, 1,846,302, 1,942,854, 1,990,507, 2,112,140, 2,165,338, 2,493,747, 2,493,748, 2,503,776, 2,519,001, 2,666,761, 2,734,900, 2,739,149 and 2,739,964.

The emulsions may also contain speed-increasing compounds of the quaternary ammonium type as described in U.S. Patents Nos. 2,271,623, 2,288,226 and 2,334,864, and of the polyethylene glycol type as described in U.S. Patent No. 2,708,162.

Where desired, other suitable reagents such for example as antifoggants, restrainers, accelerators, preservatives, coating aids, and/or stabilizers may be included in the composition of the emulsions.

Since certain changes may be made in the above process and product without departing from the scope of the invention herein involved, it is intended that all matter contained in the above description shall be interpreted as illustrative and not in a limiting sense.

What is claimed is:
1. A method of preparing silver halide emulsions which comprises, in combination, the steps of mixing together a water-soluble silver salt and at least one water-soluble halide salt in an aqueous solution comprising a peptizing agent to form therein a dispersion of silver halide, said dispersion having therein, at least after formation, an acid-coagulable derivative of gelatin with trimellitic acid anhydride; the ratio, by weight, of said derivative to said peptizing agent being at least 1 to 3; subsequently lowering the pH to bring about precipitation and separating the precipitated silver halide emulsion from the supernatant liquid.

2. A process as defined in claim 1 wherein the ratio of said derivative to said peptizing agent is at least 1 to 1 by weight.

3. A process as defined in claim 1 wherein the ratio of said derivative to said peptizing agent is at least 2 to 1 by weight.

4. A process as defined in claim 1 wherein said derivative is added subsequent to the formation of said dispersion.

5. A process as defined in claim 1 wherein said derivative is prepared by reacting gelatin with at least 5% by weight, based on said gelatin, of trimellitic acid anhydride.

6. A process as defined in claim 1 wherein said derivative is prepared by reacting gelatin with about 10% by weight, based on said gelatin, of trimellitic acid anhydride.

7. A process as defined in claim 1 wherein said pH is lowered to between about 4.5 to about 2.0.

8. A process as defined in claim 1 wherein said derivative of gelatin with trimellitic acid anhydride is initially present as the peptizing agent.

9. A method of preparing silver halide emulsions which comprises, in combination, the steps of mixing together a water-soluble silver salt and at least one water-soluble halide salt in an aqueous solution comprising a peptizing agent to form therein a dispersion of silver halide, said dispersion having therein, at least after formation, an acid-coagulable derivative of gelatin with trimellitic acid anhydride, said derivative of gelatin with trimellitic acid anhydride being prepared by reacting gelatin with at least 5% by weight, based on said gelatin, of trimellitic anhydride; the ratio, by weight, of said derivative to said peptizing agent being at least about 1 to 1, by weight; subsequently lowering the pH to between about 4.5 to about 2.0 to bring about precipitation and separating the precipitated silver halide emulsion from the supernatant liquid.

10. A process as defined in claim 9 wherein said derivative is added subsequent to the formation of said dispersion.

11. A process as defined in claim 9 wherein said derivative is prepared by reacting gelatin with about 10%, by weight, based on said gelatin, of trimellitic acid anhydride.

12. A process as defined in claim 9 wherein said derivative of gelatin with trimellitic acid anhydride is initially present as the peptizing agent.

13. A photographic product comprising a colloid carrier and a light-sensitive silver halide, said carrier comprising a derivative of gelatin with trimellitic anhydride.

14. A product as defined in claim 13 wherein said derivative is prepared by reacting gelatin with at least 5%, by weight, based on said gelatin, of trimellitic acid anhydride.

15. A product as defined in claim 14 wherein 10% of said trimellitic anhydride is used.

References Cited in the file of this patent

UNITED STATES PATENTS

| 2,403,428 | Mueller et al. | July 2, 1946 |
| 2,614,929 | Yutzy et al. | Oct. 21, 1952 |
| 2,888,465 | Hodes | May 26, 1959 |

OTHER REFERENCES

Tajima et al.: Chemical Abstracts, vol. 53, p. 3958 (1959).